United States Patent [19]

Cucchetto

[11] Patent Number: 4,530,433
[45] Date of Patent: Jul. 23, 1985

[54] BOTTLE-HOLDER PINCERS FORMING A LINK IN A CONVEYOR CHAIN

[75] Inventor: Federico Cucchetto, S. Maria di Negrar, Italy

[73] Assignee: Enomec S.R.L., Verona, Italy

[21] Appl. No.: 492,594

[22] Filed: May 9, 1983

[30] Foreign Application Priority Data

May 18, 1982 [IT] Italy .................. 85567 A/82

[51] Int. Cl.³ .............................................. B65G 47/86
[52] U.S. Cl. .................................................. 198/695
[58] Field of Search ............... 198/479, 653, 695, 851, 198/694, 696

[56] References Cited

U.S. PATENT DOCUMENTS 2,942,719  6/1960  Bofinger et al. .............. 198/653
3,470,995  10/1969  Kuhnle et al. ................ 198/653
4,172,514  10/1979  Shantz et al. ................. 198/479

FOREIGN PATENT DOCUMENTS 116950  5/1943  Australia ................... 198/694
567986  10/1975  Switzerland ............... 198/479

Primary Examiner—Joseph E. Valenza
Assistant Examiner—Kyle E. Shane
Attorney, Agent, or Firm—Bucknam and Archer

[57] ABSTRACT

The pincers consist of a plate (1) having lateral openings (2 and 3) on one side and a center opening (4) on the other, which links up with the lateral openings in the adjacent plate so as to form a conveyor chain for bottles gripped by the jaws (14 and 15) of the pincers, which act in conjunction with a half-collar (20) fitting the outline of the neck of the bottle being processed, which can thus follow any path of travel, held only by the neck (FIG. 3).

4 Claims, 4 Drawing Figures

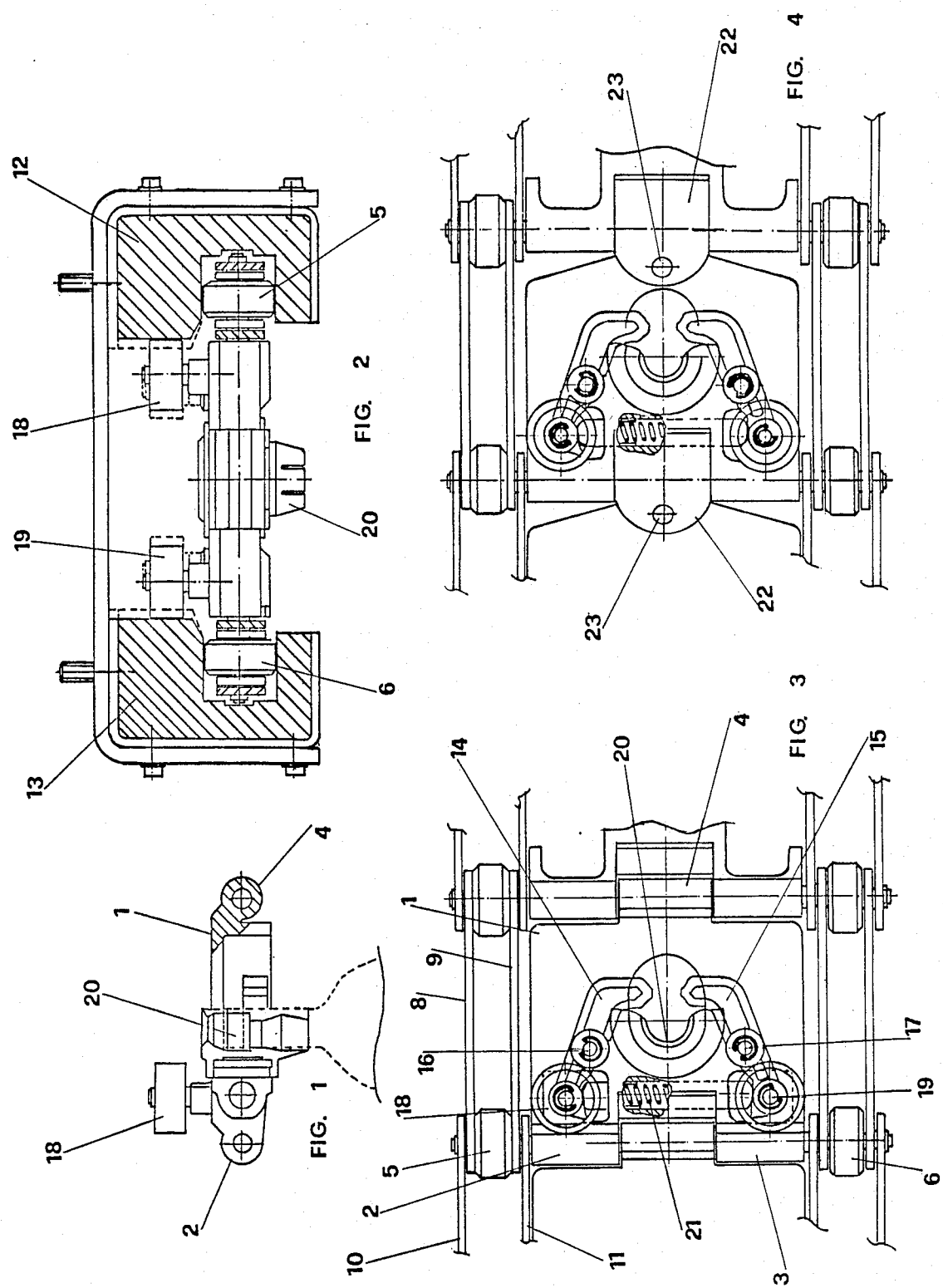

BOTTLE-HOLDER PINCERS FORMING A LINK IN A CONVEYOR CHAIN

The purpose of the present invention is to produce pincers suitable to grip bottles in a conveyor chain in a machine for washing and filling bottles, the said pincers forming a link in a chain capable of transporting the said bottles.

The jaws of the pincers are in fact in the form of pivotal levers, which at the end opposite to the pincer end have rollers which, held on guiderails at predetermined points on the path of travel, open the pincers to release the neck of the bottle, acting in opposition to springs which stretch to close the pincers.

An essential characteristic of the invention is that the whole unit comprising the pivotal pincers, their guide rollers and the return springs, is mounted on a link in a bottle conveyor chain, connected to the adjacent links by means of pins and equipped with lateral brackets having guide rollers, the whole forming a conveyor chain.

Another novel characteristic of the pincers is the fact that the link/pincers have an interchangeable half-collar, shaped to follow the outline of the neck of the bottle, which makes it easy to adapt the machine to any type of bottle being processed.

A further novel characteristic of the device covered by the invention is the fact that the bottles are only held by the neck, without having to have recourse to any other kind of point of support, which makes it possible to cause the bottles to follow any route, assuming different orientations and inclinations, without using special guides except those needed to hold the rollers carrying the links of the chain.

The invention will now be described in more detail with the help of the attached plate of drawings, where:

FIG. 1 shows a longitudinal section of the pincers;

FIG. 2 shows a cross section of the same, mounted on their control guide;

FIG. 3 shows a plane view of the same;

FIG. 4 shows a diagrammatic view of a variant of the embodiment of the link according to the invention, for chains whose travel is not rectilinear but curvilinear.

The pincers according to the invention consist of a plate 1 (FIG. 3), rectangular in shape, having on one side two openings 2 and 3, separated from each other, and on the other a centre opening 4, which is held by the same pin that connects the two side openings in the following link so as to form, by means of a series of consecutive pincers, a bottle conveyor chain.

The same pin that connects openings 2 and 3 in a link to opening 4 in the link connected to it, carries two rollers 5 and 6, connected to the adjacent rollers by means of brackets 8 and 9 on one side and 10 and 11 on the other, the arrangement being repeated on the other side of plate 1 so as to form a pair of parallel chains, which guide the series of links forming the conveyor chain on guide rails, consisting essentially of the cavity in a U-shaped section, as can clearly be seen in FIG. 2, where the sections themselves bear the numbers 12 and 13.

Each link 1 is fitted with two pivotal levers 14 and 15 (FIG. 3) hinged at 16 and 17 and having at the opposite ends rollers 18 and 19, which run on the inside lateral surfaces of sections 12 and 13, acting in opposition to a return spring 21 which is compressed when the surfaces on which the rollers slide come together, moving into the position shown in dashes in FIG. 2.

In this position jaws 14 and 15 open, leaving the bottle free.

The neck of the latter is thus held between the said jaws 14 and 15 and the half-collar 20 suitably shaped to fit the outline of the neck of the bottle. The said half-collar is easily interchangeable to adapt it to the different outlines of the necks of the bottles to be processed in the machine.

The rails 12 and 13 follow the path provided for in the machine, thus determining the different orientation and different inclination of the bottles held by the individual links in the conveyor chain, which seize the bottles from special shaped machine intake guides in order to make them follow the path provided for and then release them to other, outlet guides, suitably arranged.

Note that each bottle is gripped by the pincers by its neck and is thus supported solely by the link in the conveyor chain and can assume different orientations and inclinations in relation to its own axis, as required by the various processing stages, both during washing and during filling of the bottle.

The half-collar 20 can easily and quickly be replaced, which makes it easy to adapt the whole series making up the chain to the various types of bottles being processed, for which a number of half-collars of suitable sizes are obviously provided, each of which can be common to several types of bottles.

This makes it possible to adapt the same machine to different types of bottles, all that is required is replacement of the half-collars to adapt the machine to a new type of bottle, when necessary.

As a variant of the embodiment of the links according to the invention, provision is made for the link to be fitted with a fork 22, arranged in front of it, with a pin 23 which hooks on to the adjacent link, which enables the consecutive links to change their orientation on the conveyor guide.

It is obvious that the constructional details of the pincers described here and illustrated in the attached plate of drawings can be different in shape and appearance, the essential characteristics of the invention remaining unchanged, without thereby departing from the scope of the patent.

I claim:

1. BOTTLE-HOLDER PINCERS FORMING A LINK IN A CONVEYOR CHAIN characterized by the fact that on a plate (1), virtually rectangular in shape, equipped on one side with two lateral openings (2 and 3) and on the opposite side with a centre opening (4), which fits into the lateral openings in the adjacent link, two pivotal levers (14 and 15) are mounted, which grip the neck of the bottle, acting in opposition to a half-collar (20) which follows the shape of the neck of the bottle being processed, while on the opposite side of two guides (12 and 13) which, narrowing, act on the rollers (18 and 19) of the levers so as to open the pincers (14 and 15), acting in opposition to the return spring (21) so as to release the bottle from the pincers.

2. BOTTLE-HOLDER PINCERS according to claim 1 characterized by the fact that a half-collar (20), shaped according to the outline of the neck of the bottle, is mounted to correspond with the centre hole in the link (1) and can be replaced by another half-collar of a different type whenever the type of bottle being processed so requires.

3. BOTTLE-HOLDER PINCERS according to claim 1 characterized by the fact that a pair of rollers (5 and 6) is mounted on the ends of the pin which connects one link to the next, which pin in turn is connected to the adjacent pins by means of pairs of bars (8, 9, 10 and 11) on either side of the link (1) so as to form a pair of facing chains which flank the main chain consisting of the communicating plates in the machine where the chain carrying the bottles is mounted.

4. BOTTLE-HOLDER PINCERS according to claim 1 characterized by the fact that each link in the chain has a front fork (22), with a centre pin (23), which connects the link to the adjacent link, allowing changes in orientation horizontally to the chain.

* * * * *